April 5, 1955   E. L. POTTER, JR., ET AL   2,705,633
SHOCK ABSORBING MEANS FOR RAILROAD CAR TRUCKS
Filed Nov. 26, 1949   2 Sheets-Sheet 1
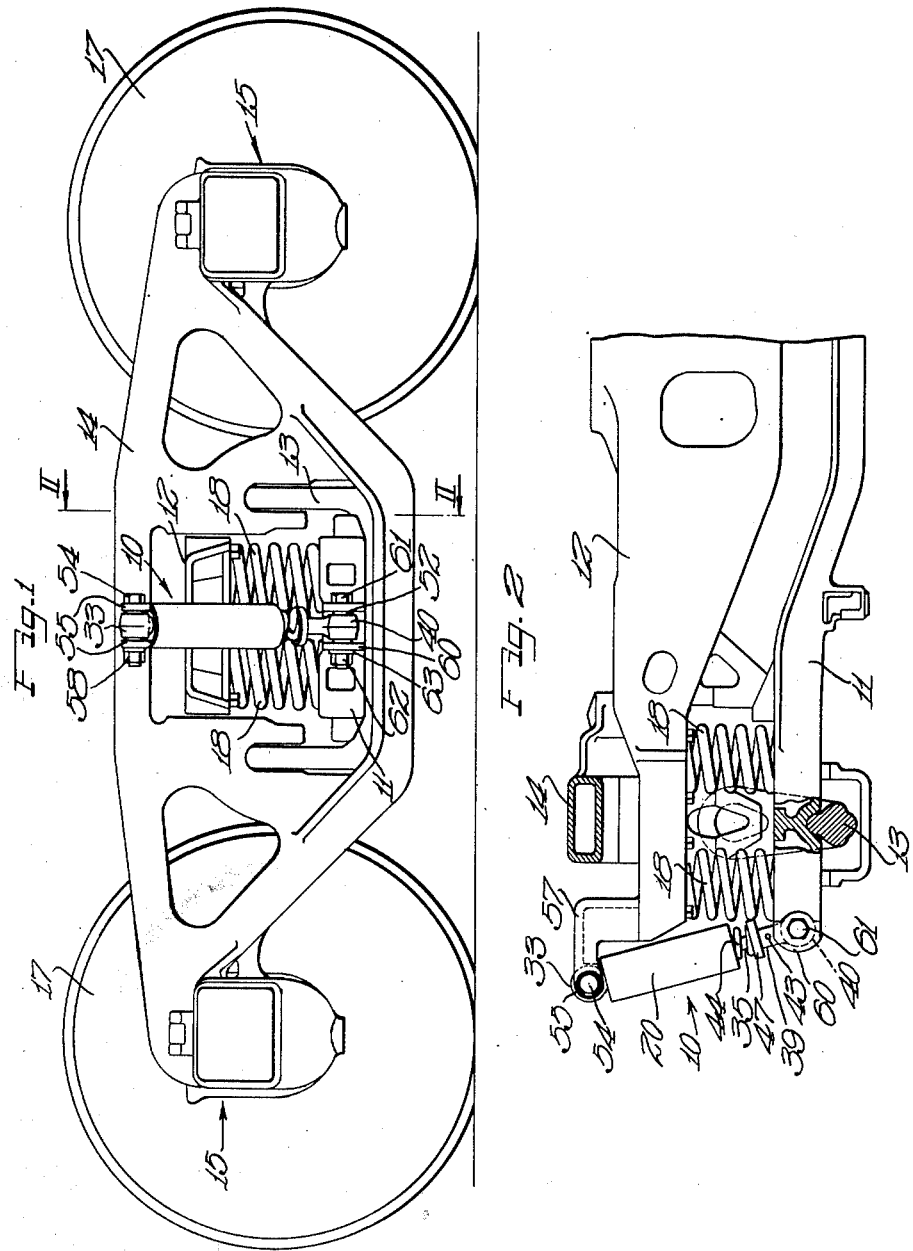
Inventors
Elbert Leland Potter, Jr.
William H. Mergi
By The Firm of Charles W. Hills
Attys April 5, 1955  E. L. POTTER, JR., ET AL  2,705,633
SHOCK ABSORBING MEANS FOR RAILROAD CAR TRUCKS
Filed Nov. 26, 1949  2 Sheets-Sheet 2
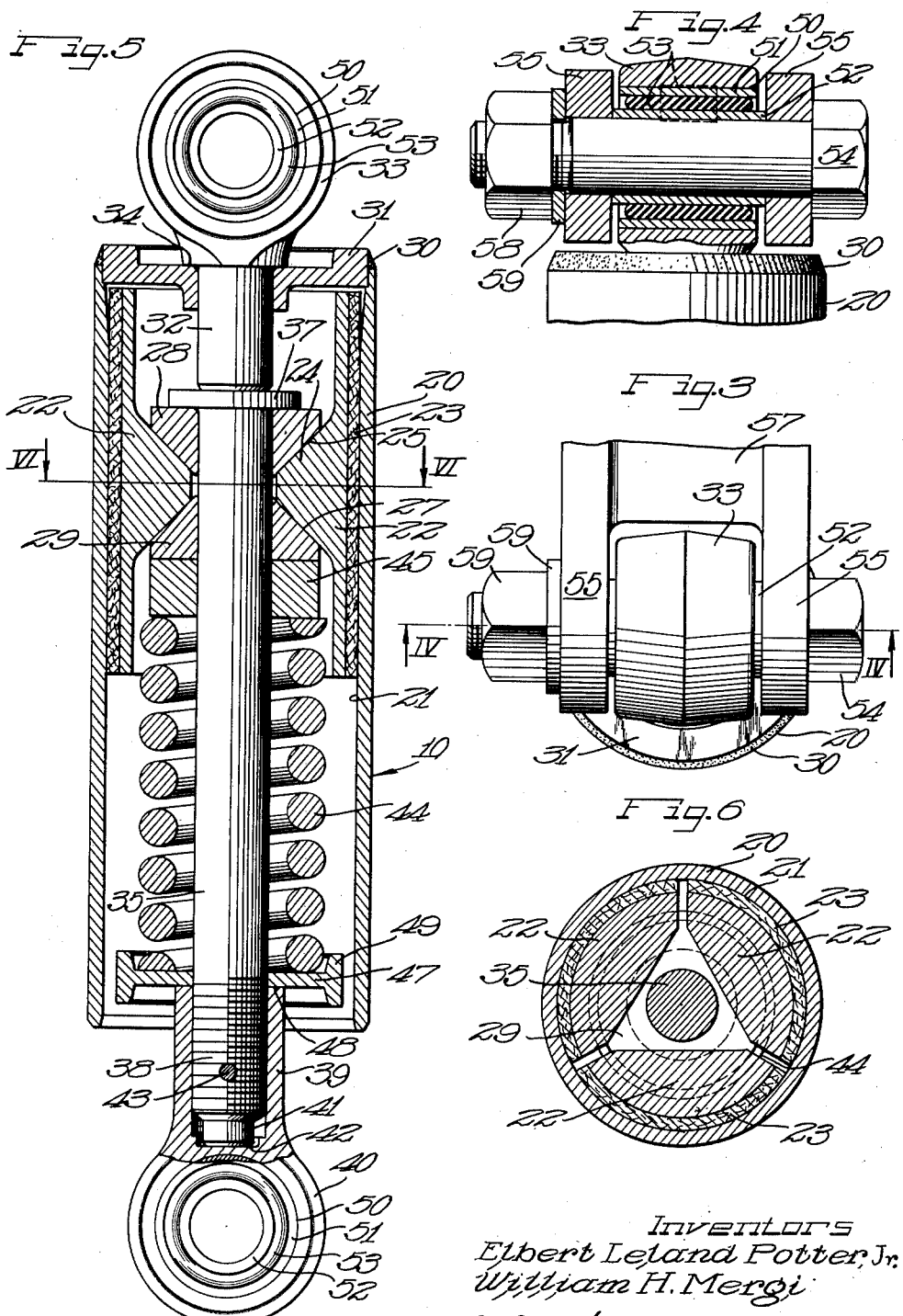
Inventors
Elbert Leland Potter, Jr.
William H. Mergi
By The Firm of Charlesworth Attys United States Patent Office 2,705,633
Patented Apr. 5, 1955

2,705,633

SHOCK ABSORBING MEANS FOR RAILROAD CAR TRUCKS

Elbert Leland Potter, Jr., and William H. Mergi, Buffalo, N. Y., assignors to Houdaille-Hershey Corporation, Detroit, Mich., a corporation of Michigan Application November 26, 1949, Serial No. 129,574

2 Claims. (Cl. 267—9)

The present invention relates to improvements in shock absorbing means for railroad car trucks and more particularly concerns an improved shock absorbing construction between the spring plank and bolster of a railroad car truck assembly.

In addition to the normal up and down or vertical relative movements between a railroad car truck bolster and the spring plank as permitted by the springs supporting the bolster on the plank, various relative horizontal movements of more or less limited magnitude occur between the bolster and spring plank in service. As a result a substantial problem is created in the mounting and operation of shock absorbers between the bolster and spring plank, and more particularly at the end connections between the shock absorbers and the portions of the bolster and spring plank to which connected.

An important object of the present invention is to provide improved shock absorbing means for railroad car trucks and more especially for efficiently and economically damping and absorbing shocks between the bolsters and spring planks of such trucks.

Another object of the invention is to provide improved means for mounting a shock absorber between the bolster and the spring plank of a car truck.

A further object of the invention is to provide an improved heavy duty end connector structure for effective attachment of a direct-acting type of shock absorber between relatively movable members in which shocks tending to cause relative movement of the members in one direction must be dampened or absorbed, but limited relative movement of the members in all other directions must also be accommodated.

Still another object of the invention is to provide an improved friction shock absorber, having a special regard to the end connectors therefor.

Other objects, features and advantages of the present invention will be readily apparent from the following detailed description of a preferred embodiment thereof taken in conjunction with the accompanying drawings, in which:

Figure 1 is a side elevational view of a representative form of railroad car truck embodying the features of the present invention;

Figure 2 is a fragmentary vertical sectional detail view taken substantially on the line II—II of Figure 1;

Figure 3 is an enlarged top plan view of the shock absorber shown in Figures 1 and 2 and the bracket by which the upper end of the shock absorber is connected to the bolster;

Figure 4 is a vertical sectional detail view taken substantially on the line IV—IV of Figure 3;

Figure 5 is a vertical sectional view through the shock absorber but showing the same in non-service condition; and Figure 6 is a horizontal sectional view taken substantially on the line VI—VI of Figure 5.

According to the present invention, a direct-acting shock absorber 10, herein shown as of the friction type, is operatively connected between the adjacent ends of a spring plank 11 and a bolster 12 of a railroad car truck (Figures 1 and 2). Although only one side of the truck is shown, it will be understood that in practice a similar construction prevails at both sides of the truck. That is, one of the shock absorbers 10 is connected between the ends of the spring plank and bolster at each side of the truck.

At each opposite end, the spring plank 11 is supported by a swing hanger 13 swingably supported in any preferred manner by a side frame 14 which at its ends is supported in the usual manner through the medium of a journal box structure 15 upon the respective ends of the axles of wheels 17.

Cushioned support of the bolster 12 upon the spring plank 11 is effected through the medium of a set of springs 18 interposed between the end portion of the bolster and the subjacent end portion of the spring plank. This spring mounting of the bolster of course permits relative vertical movements between the spring plank and the spring-supported bolster. The springs also permit limited movement between the spring plank and bolster in horizontal direction, certain stabilizing relationships between the bolster and side frame and between the spring plank and the swing hangers 13 limiting movement in a front to rear direction to very small magnitude, but the springs 18 and the swing hanger 13 permitting substantial relative movement between the bolster and spring plank in a transverse direction, which is in a longitudinal direction with respect to the spring plank and bolster.

The shock absorbing unit 10 functions to dampen and absorb shocks between the spring plank and the bolster and to snub unusual, violent or accelerated relative movements between the spring plank and bolster and more especially such movements in a vertical direction and in a transverse direction relative to the car truck. To this end, the snubber or shock absorber 10 includes, in each instance, means strongly effective by cooperation of elements internally of the shock absorber unit to snub or dampen relative vertical movements between the spring plank 10 and the bolster 12 resulting from the spring mounting of the bolster. In addition, and quite importantly, each shock absorber unit 10 also includes means quite effective to dampen shocks resulting from any horizontal relative movements between the spring plank 11 and the bolster 12 and which horizontal movements, though of less importance than the vertical movement, are nevertheless important factors in service both from the standpoint of passenger comfort and equipment deterioration.

Internal mechanism in the shock absorber unit 10 for snubbing or damping shock-imparting vertical relative movements between the spring plank and the bolster comprises a barrel or cylinder 20 (Fig. 5) having an internal wall surface 21 defining a chamber and providing a cylindrical friction face with which cooperate a set of snubber shoes 22, each of which is preferably equipped with a preferably non-metallic friction facing or liner 23. The shoes 22 may be three in number as best seen in Fig. 6 normally in mutually spaced peripheral relation and having effective friction faces opposing the cylinder wall 21 on a complementary radius. Each of the shoes 22 is formed with an inner wedge boss 24 formed with opposite upper and lower tapering bearing wedge surfaces 25 and 27, respectively. A wedge ring 28 bears in complementary sliding relation against the bearing surfaces 25 of the shoes and a similar tapered wedge ring 29 bears in sliding wedging relation against the wedge surfaces 27 of the shoes.

The construction and arrangement is such that relative slow vertical movements between the shoes 22 and the cylinder 20 are permitted for normal springing action between the spring plank 11 and the bolster 12, but relatively rapid or violent or sudden vertical movements are snubbed by action of the wedge blocks or rings 28 and 29 against the shoes 22 acting to drive the shoes radially outwardly uniformly against the friction surface 21 of the cylinder 20 and thus resisting relative vertical or longitudinal movement between the shoes and the cylinder. To this end, means are provided for connecting the cylinder 20 to the bolster 12, and means are provided for operatively connecting the shoes 22 through the medium of the wedge rings 28 and 29 to the spring plank 11. Accordingly, the upper end of the cylinder 20 is secured as by means of welding 30 to a closure cap 31 through the center of which projects a boss or post 32 formed integral in one piece with a connecting head 33 projecting beyond the upper end of the shock absorber unit. Any form of solid permanent connection between the closure plate 31 and the attachment post 32 may be employed but by preference the cap or plate and post are welded together, the attachment being strengthened and enhanced by an annular larger diameter shoulder 34 on the head 33 surrounding the post 32 and engaging against the adjacent portion of the outer face of the end plate or cap 31. Through this arrangement the cylinder 20, the end cap 31 and the head 33 are secured together into a rigid, solid integral unit.

The shoes 22 and the wedge rings 28 and 29 are maintained in operative assembly and connected to the spring plank 11 through the medium of a connecting rod 35 which extends axially up through the cylinder 20 and freely through the wedge rings 28 and 29 and has at its upper or inner end preferably formed integrally in one piece therewith a radial flange 37 which engages against a complementary upper face of the wedge ring 28. At its lower end portion, the bolt or rod 35 is threaded as indicated at 38 and is threadedly interconnected into an internally threaded socket boss 39 integral in one piece with a connecting head 40. To effect a permanent solid connection, the lower extremity of the rod 35 is formed as a reduced diameter terminus 41 which in assembly is bottomed solidly against a lower end wall or shoulder 42 in the connecting head socket, and after effecting the solid bottoming, a retaining pin 43 is driven transversely into aligned bores provided in the socket wall and the rod by drilling through the same after the solid bottoming assembly of the rod in the socket. Thereby axial or rotary looseness between the rod and the connecting head 40 are positively prevented.

Normal resilient compression is maintained upon the wedge rings 28 and 29 by means of a coiled compression spring 44 seating at its upper end against an abutment ring or block 45 bearing against the opposing underface of the wedge ring 29 and freely longitudinally slidable relative to the rod 35 about which both the spring 44 and the block or ring 45 are coaxial. At its lower end the spring 45 is in abutment with a ring or plate member 47 coaxial about the rod 35 and bearing against an end shoulder 48 on the socket boss 39. The abutment member 47 has an annular retaining flange 49. Thus, the spring 44 is maintained under predetermined compression driving against the abutment ring 45 and thus driving the wedge ring 29 against the opposing wedge faces 27 of the friction shoes, while at the same time by the reaction of the spring 44 against the abutment member 47, the wedge bolt or rod 35 is drawn downwardly so that the flange 37 drives the wedge ring 28 toward the wedge faces 25 of the shoes. This maintains the shoes 22 normally in predetermined frictional engagement with the friction surface 21 of the cylinder 20. When the cylinder 20 or the wedge bolt 35 is subjected to longitudinal shock, the normal resistance of the shoes 22 creates a frictional drag which causes the respective wedge rings 28 or 29 to wedge the shoes into even stronger frictional gripping engagement with the friction surface 21 and thus effects a snubbing or shock absorbing or shock damping action. Appropriate lubrication is, of course, provided between the wedge surfaces of the shoes and wedge rings.

In the illustration of the shock absorber in Fig. 5, the fully compressed or collapsed condition of the shock absorber is shown wherein the stem or post 32, extending inwardly a predetermined distance, serves as a stop engaged by the wedge bolt flange 37 to define the maximum collapsed condition. In service, however, the wedge bolt 35 and thereby the friction shoe mechanism with which connected will be withdrawn to a limited extent, substantially as shown in Figs. 1 and 2, thereby affording an operative range of vertical movement of the internal cooperating compenents of the shock absorber 10.

According to the present invention, the construction and arrangement of the connecting heads 33 and 40 and the manner in which such heads are connected to the bolster 12 and the spring plank 11, respectively, not only enhances the shock absorbing characteristics of the shock absorber 10 for snubbing and damping vertical shocks but also affords an effective snubbing and damping medium for all relative vertical movements between the bolster and the spring plank. To this end, each of the connecting heads 33 and 40 is formed as an eye, preferably of identical construction. Each eye has an eye bore 50 within which is press-fitted a liner bushing 51 (Figs. 4 and 5). Concentric with the bushing 51 and of smaller external diameter is a sleeve 52 which cooperates with the bushing 51 to maintain under strong compression a resilient, shock-absorbing bushing 53 of rubber or other material having the same characteristics as rubber. This resilient bushing is compressed from a substantially larger outside diameter and smaller inside diameter and shorter length, as indicated in dash outline in Fig. 4, so as to place it under great tension between the bushing 51 and the sleeve 52. Thereby the resilient sleeve or bushing 53 holds the sleeve 52 centered and strongly resists any further compression and also strongly resists any torsional stresses. These resistance characteristics are utilized in the shock absorber connection for snubbing and shock absorbing purposes.

Attachment of the connecting head eyes 33 and 40 of the shock absorber unit 10 is effected in a simple and efficient manner. Accordingly, the eye head 33 is secured to the bolster 12 by means of an attachment bolt 54, the shank of which extends through the inner sleeve 52 and through and between opposed parallel spaced attachment ears 55 preferably formed integral in one piece with a bracket 57 secured to or formed integrally in one piece with the end extremity of the bolster 12. By preference, as best seen in Fig. 2, the bracket 57 is of an angular form extending up and outwardly from the upper side of the bolster end extremity portion. As best seen in Figs. 1, 3 and 4, the attachment ears 55 are spaced apart more than the length of the connecting head eye 33, and the inner sleeve 52 is of greater length than the head eye 33 and the bushing 51 to an extent equal to the greater spacing between the attachment ears 55 than the length of the head eye. The opposite ends of the sleeve 52 project equally beyond the opposite ends of the head eye and thus maintain a uniformly spaced relationship between the ends of the head eye 33 and the attachment ears 55. By drawing the attachment bolt 54 up tight through the medium of a nut 58 and lock washer 59, the attachment ears 55 are drawn firmly against the projecting ends of the sleeve 52 and thereby hold the sleeve immovable relative to the ears 55. As a result, torsional movements of the bushing 51 and the head eye 33 relative to the sleeve 52 are strongly resisted by the resilient bushing connection 53. While the connecting head 33 is permitted to tilt substantially relative to the connecting bolt 54 and the firmly retained sleeve 52, the strong resistance to further compression or stress by the resilient, compressed bushing 53 strongly resists such relative tilting movement.

Attachment of the connecting head 40 with the spring plank 11 is effected in substantially the same manner as described in connection with the connecting head 33. To this end, the end extremity of the spring plank 11 is equipped with or formed integrally with a spaced parallel pair of attachment ears 60 spaced apart the same as the attachment ears 55 and having the sleeve 52 associated with the head 40 secured firmly therebetween by means of a bolt 61 having a nut 62 and a lock washer 63 by which it is drawn up to bind the ears 60 against the ends of the sleeve 52. As a result, the connecting head 40 is restrained against relative torsional movements by the resilient compressed bushing 53 associated therewith and although limited tilting movement of the head 40 is permitted by reason of its spaced relation to the attachment ears 60, the compressed bushing 53 resists such relative tilting movement.

As best observed in Figs. 1 and 2, the shock absorber unit 10 is preferably disposed on a slant in a transverse plane relative to the car truck and in the present instance this is effected by having the bolster bracket 57 project outwardly beyond the attachment ears 60 on the spring plank 11. Hence, in addition to longitudinal relative movement between the internal snubbing components of the shock absorber unit, there will also be a certain amount of shifting of the tilt axis of the shock absorber during vertical relative movements between the bolster 12 and the spring plank 11 which places the resilient bushings 53 under torsional stress, so that the resilient bushings cooperate with the internal snubbing mechanism of the shock absorbers in resisting vertical shock-imparting movements between the bolster and the spring plank. Relative movements generally horizontally between the bolster and spring plank transversely to the car truck, that is longitudinally of the bolster and spring plank, and tending to rock the shock absorber 10 about the axes of the attachment bolts 54 and 61 subject the resilient bushings 53 to substantial torsional movement resisting stress effective to absorb and dampen and snub shocks transversely of the car truck. Relative movements longitudinally of the car truck, that is transversely of the bolster 12 and the spring plank 11, are snubbed by the compression stress resistant of the bushings 53 of both the upper connecting head 33 and the lower connecting head 40 cooperating. As a result, rugged, economical and quite effective snubbing and shock absorbing means are provided for railway car trucks.

It will be understood that modifications and variations may be effected without departing from the scope of the novel concepts of the present invention.

We claim as our invention:

1. In a direct acting friction shock absorber for railway cars, a friction cylinder, a friction shoe assembly within said cylinder, means for actuating said shoe assembly including a rod extending beyond an end of the cylinder, a connecting head comprising an eye having extending radially therefrom a socket portion having a socket provided with a flat bottom on said eye and internally threaded, said rod being threaded into said socket and having a flat portion thrusting fixedly against said bottom, a pin securing the portion of the rod within the socket against loosening, said socket portion having a shoulder at its extremity, a spring abutment member engaging against said shoulder, and a biasing spring engaging said abutment member and coacting with the friction shoe assembly within the cylinder.

2. In a friction shock absorber, a cylinder, a closure plate secured to one end of the cylinder, a connector eye having a generally radially extending boss projecting a short distance radially therefrom and including a stem projecting radially axially integrally from the boss and having a shoulder of the boss about the base of the stem, said closure plate having an axial aperture through which said stem projects into the interior of the cylinder, said shoulder bearing against the closure plate about said aperture, said stem being secured rigidly in place with respect to said closure plate, and a friction snubber assembly within said cylinder including a member relatively movable into abutment with the tip of said stem.

References Cited in the file of this patent

UNITED STATES PATENTS

| | | |
|---|---|---|
| 596,846 | Brown | Jan. 4, 1898 |
| 1,940,302 | Humphrey et al. | Dec. 19, 1933 |
| 1,954,277 | Zerk | Apr. 10, 1934 |
| 2,059,503 | Webb | Nov. 3, 1936 |
| 2,212,759 | Tea | Aug. 27, 1940 |
| 2,237,056 | Manning | Apr. 1, 1941 |
| 2,237,318 | Snyder | Apr. 8, 1941 |
| 2,253,646 | Paton | Aug. 26, 1941 |
| 2,264,702 | Latshaw | Dec. 2, 1941 |
| 2,344,034 | Elsey | Mar. 19, 1944 |
| 2,379,005 | Jackson et al. | June 26, 1945 |
| 2,404,666 | Snyder | July 23, 1946 |
| 2,434,287 | Pflager | Jan. 13, 1948 |
| 2,516,082 | Spencer | July 18, 1950 |
| 2,519,169 | Beemer et al. | Aug. 15, 1950 |
| 2,532,272 | Janeway | Nov. 28, 1950 |
| 2,574,788 | Janeway et al. | Nov. 13, 1951 |